United States Patent [19]

Farnsworth et al.

[11] Patent Number: 4,773,446

[45] Date of Patent: Sep. 27, 1988

[54] VALVE BLOCK ASSEMBLY

[75] Inventors: Vincent R. Farnsworth, Reseda; Paul K. Cartier, III, Arcadia, both of Calif.

[73] Assignee: Porton Instruments, Inc., Encino, Calif.

[21] Appl. No.: 901,327

[22] Filed: Aug. 27, 1986

[51] Int. Cl.$^4$ .................. F16K 7/00; F16K 11/24
[52] U.S. Cl. .................. 137/606; 137/208; 137/212; 137/588; 251/61.1
[58] Field of Search ............ 137/606, 208, 212, 859, 137/588; 251/331, 61.1

[56] References Cited

U.S. PATENT DOCUMENTS

| | | | |
|---|---|---|---|
| 3,904,175 | 9/1975 | Deschenes | 251/331 |
| 3,937,248 | 2/1976 | Hutton | 137/599 X |
| 4,037,784 | 7/1977 | Sabarly | 137/859 X |
| 4,304,257 | 12/1981 | Webster | 251/331 X |
| 4,356,840 | 11/1982 | Friedland | 137/599 X |
| 4,597,412 | 7/1986 | Stark | 137/606 |
| 4,703,913 | 11/1987 | Hunkapiller | 251/61.1 |

Primary Examiner—Alan Cohan
Assistant Examiner—Stephen M. Hepperle
Attorney, Agent, or Firm—Iver P. Cooper

[57] ABSTRACT

A valve block assembly with internal delivery channels and a common outlet channel is provided. The assembly has two delivery valve surfaces with access to the common channel. The common channel comprises easily cleaned linear sections running alternately from one surface to the other, and connecting surface grooves at the valve sites. Diaphragm valves with relief grooves to accommodate deformation of the diaphragm are provided. The V-like cross-section of the connecting grooves of the common channel and the conical shape of the nearby outlet of a delivery channel assure that the valve may be opened by only a small actuating force. Reservoirs feeding the delivery channels have an inert atmosphere controlled by pressurizing and venting channels in the valve block. Exposure of plastic tubing to oxygen is kept to a minimum. The assembly is particularly adapted for use in a protein sequencer to supply reactants without cross-contamination or oxidative decomposition.

9 Claims, 7 Drawing Sheets

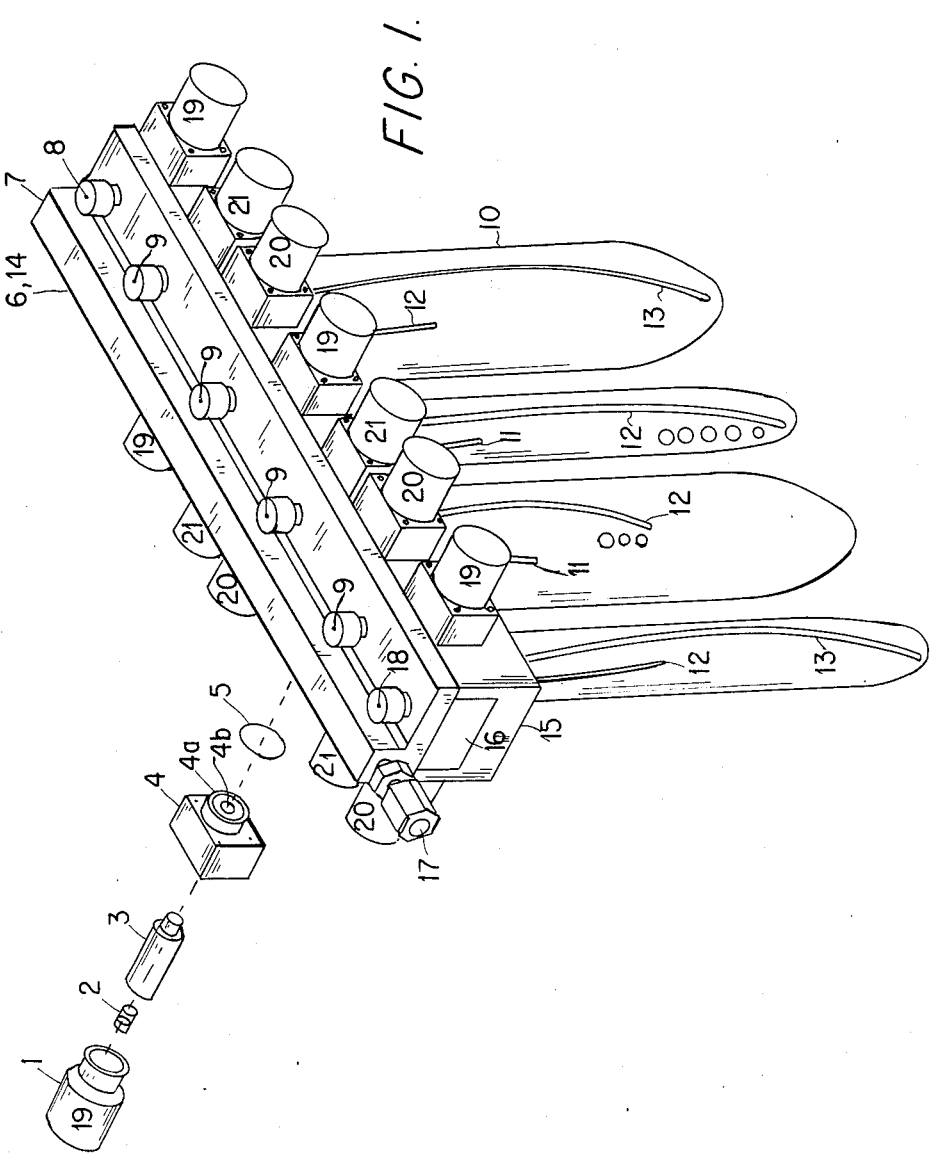

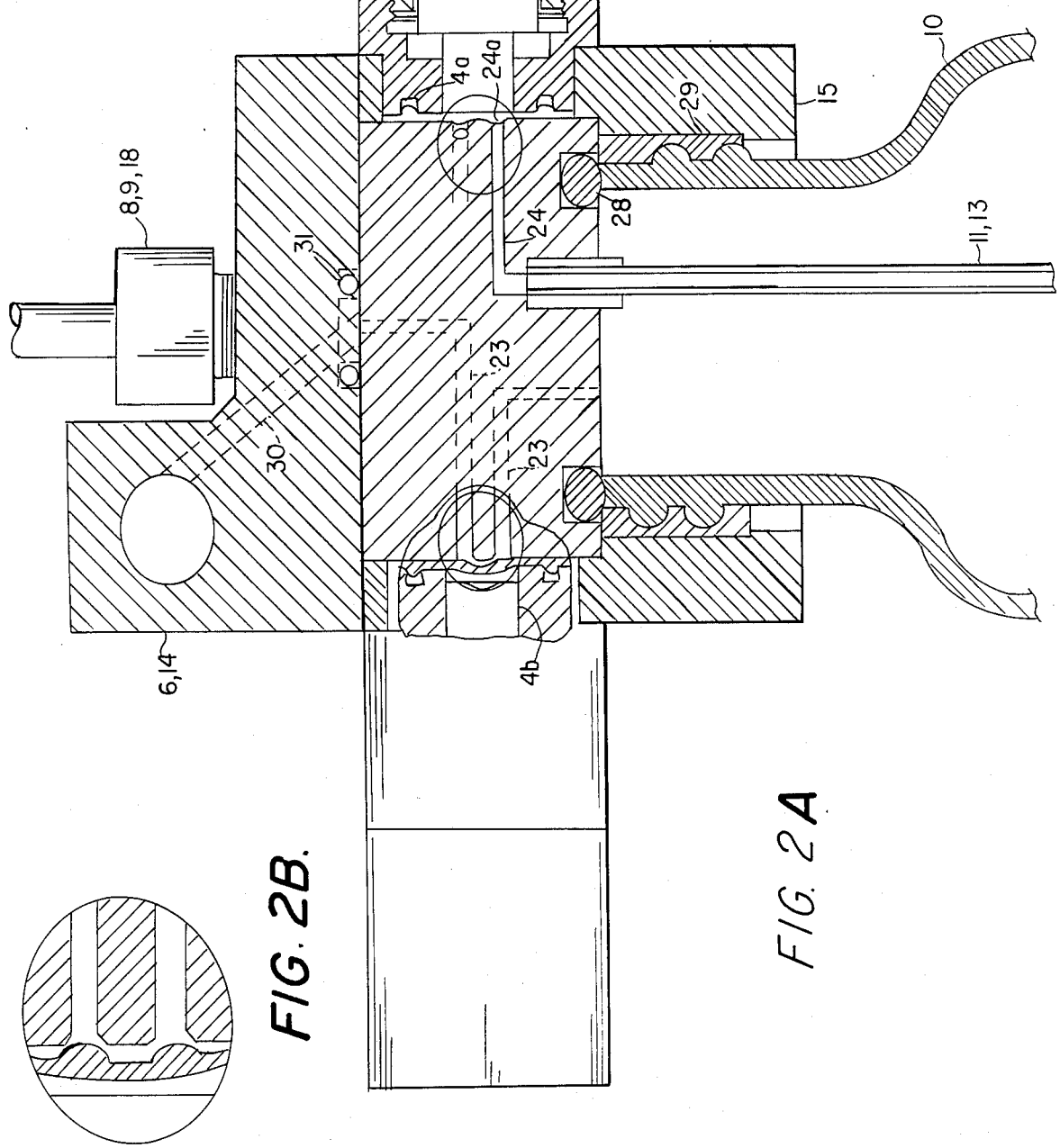

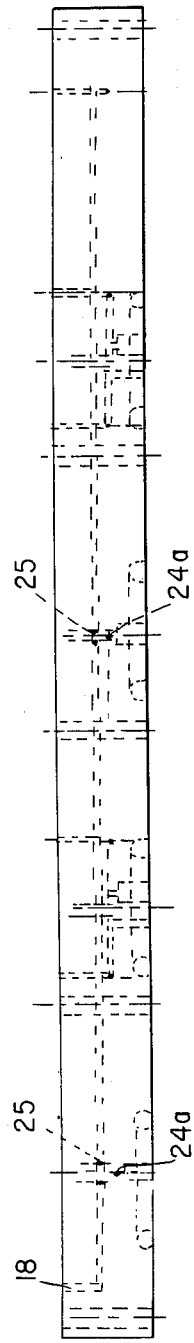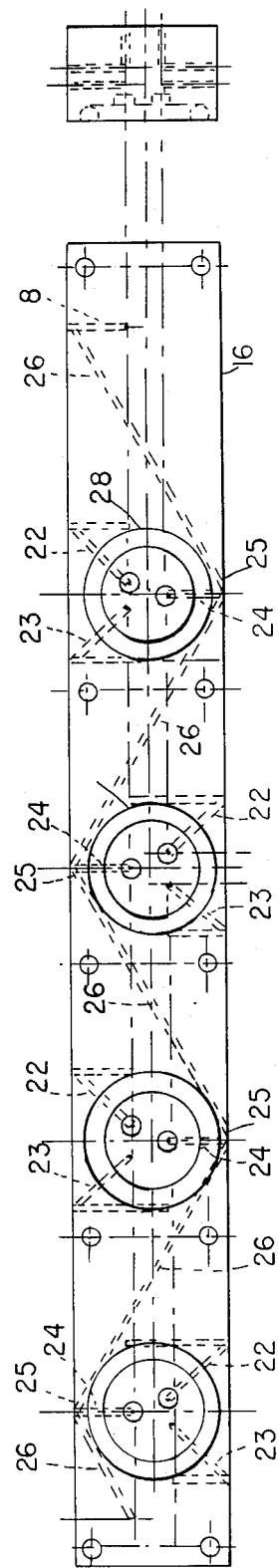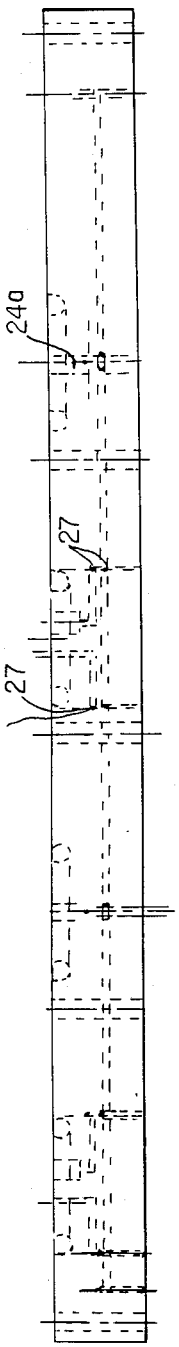

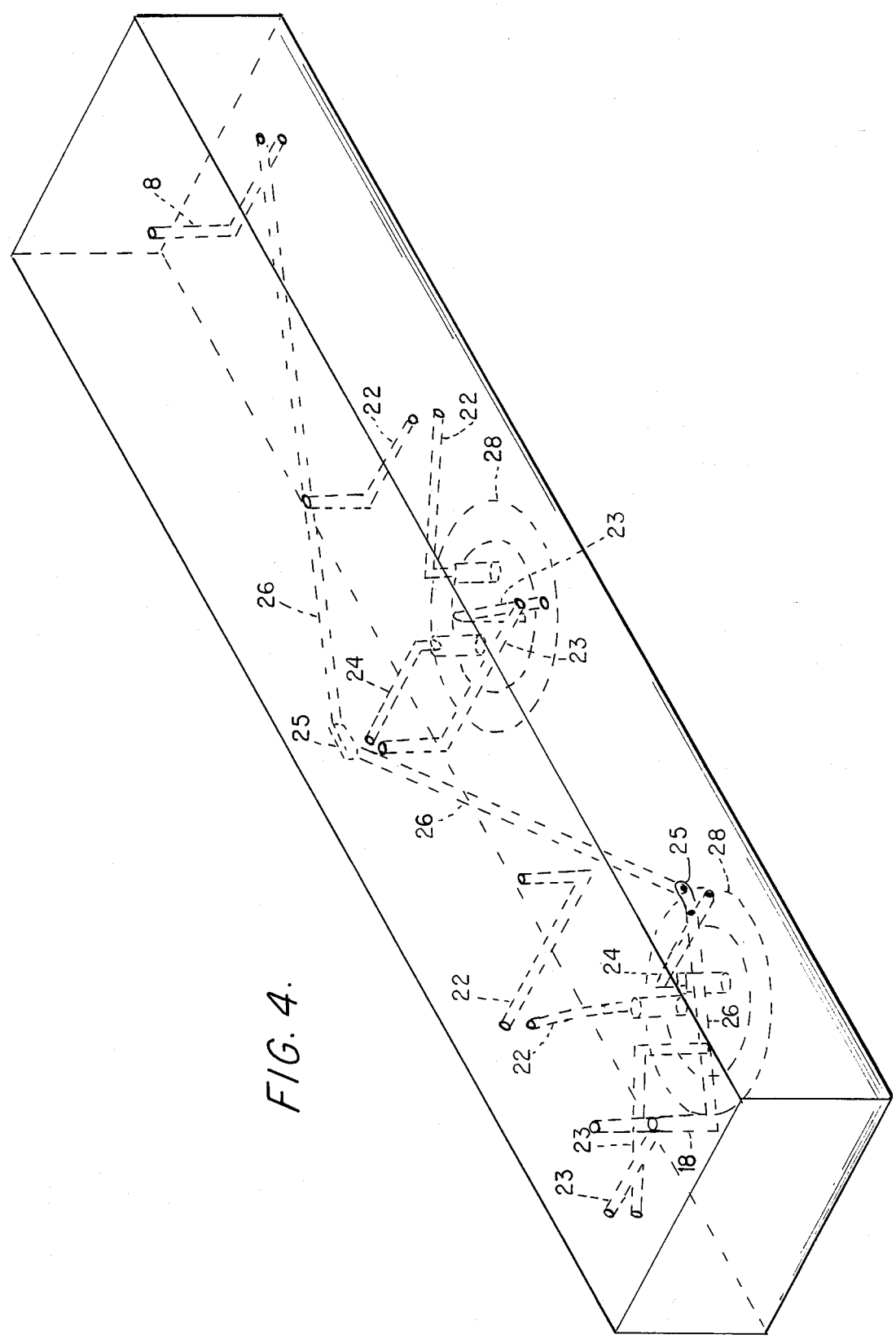

VALVE BLOCK ASSEMBLY

BACKGROUND OF THE INVENTION

This invention relates to a valve block assembly of the kind having multiple inlets and a single outlet. Such assemblies find particular application in protein sequencers.

Wittman-Liebold, U.S. Pat. No. 4,008,736 describes a valve arrangement in which a common conduit is formed in the valve block. All delivery valve sites lie on the same surface and are connected by zig-zagging portions of the conduit. While this type of common conduit may be cleaned by flushing, it cannot be cleaned easily with a wire. It is also difficult to machine.

Graffunder, U.S. Pat. No. 4,168,724 replaced the slider valves of the U.S. Pat. No. 4,008,736 with diaphragm valves. These valves are closed by fluid pressure in an actuator chamber adjacent to the diaphragm, and opened by evacuating the chamber. The zigzag sections of the common conduit intersect at the surface of the valve block. All delivery valve sites lie on the same surface.

This apparatus has several disadvantages. First, it is necessary to provide vacuum and high pressure sources. Second, the diaphragm has a tendency to cold flow into the common conduit at the point of intersection, requiring that it be moved a greater distance in order to open the valve. This in turn places greater demands on the evacuation system, and increases the wear and tear on the diaphragm.

Hunkapiller, U.S. Pat. No. 4,558,845 replaces the zigzag sections of Wittman-Liebold with straight sections which are easier to clean and to machine. However, each valve site is placed on a separate block, and the common conduit is alternately a channel in a block and tubing exposed to the atmosphere.

Hunkapiller also replaced Wittmann's actuation mechanism with a plunger that is spring-biased to a closed position. A solenoid device is used to draw the plunger to an open position. Since Hunkapiller retains the narrow access port of the previously described apparatus, his valve is likewise subject to the problem of membrane "cold flow".

SUMMARY OF THE INVENTION

This invention is directed to an integrated fluid handling system which eliminates undesirable features of prior devices. It has several noteworthy aspects.

The only exposed tubing leads from the gas regulators to the block assembly and from the valve block assembly to the receiving vessel (reaction chamber). This reduces the exposure of sensitive chemicals to oxygen diffusing through the walls of exposed tubing or leaking in where the tubes are joined to other structures. In protein sequencers, delivery rates are low, so a particular reactant may be exposed to diffusing oxygen for hours before moving to the reaction chamber. Much of the pressurizing and venting conduits for maintaining an inert atmosphere of appropriate pressure in the reservoirs is in the form of channels within the block. That part which is tubing is, with the aforestated exceptions, disposed within the controlled atmosphere of the reservoirs themselves.

In contrast, prior apparatus make heavy use of tubing, which is vulnerable to atmospheric attack. See Wittman, U.S. Pat. No. 3,959,307; Hood, U.S. Pat. No. 4,252,769.

The common outlet conduit is composed of surface grooves at the valve sites and linear connecting sections which are open to the surface at both ends. Thus, each section may be easily cleaned by passing a wire through the section. Also, these linear sections are easier to form than the zigzag sections of prior devices.

The grooves are less readily blocks by cold flowing of the diaphragm of the valve than is the narrow port of the prior devices.

If the side walls of the grooves diverge as they approach the surface, only a slight movement of the diaphragm away from the groove is needed to open fluid communication between the groove and the delivery port at each valve site. The exit hole of the adjacent delivery channel preferably has a conical or frusto-conical shape for similar reasons. Since only a slight separation of the diaphragm is needed, vacuum is not essential to valve operation.

Since each valve has its own diaphragm, the diaphragm may be selected of a material which is appropriate for containing the contents of the corresponding reservoir, and the diaphragm itself may be kept small.

The solenoid-holding block preferably has a two-tier design that reduces compressive forces on the valve block.

The upper tier holds the solenoid and the lower tier presses against the membrane. Compressive forces are mainly absorbed by the membrane rather than by the value block. The lower tier also provides the plunger guide hole.

The lower tier compresses the periphery of the diaphragm, so that, absent other forces, the center would bulge into the plunger guide hole. The plunger is spring-biased to compress the center of the diaphragm. When the plunger is withdrawn by the solenoid, the center of the diaphragm springs back to the bulging position.

The lower tier of the solenoid-holding block preferably has a relief groove into which the membrane may "cold flow". Without this feature, the membrane may "cold flow" into the plunger hole, the delivery channel and the common channel, thereby impairing the operation of the valve.

Other advantages of the present valve block design will be apparent from the following description, claims, and drawings.

BRIEF DESCRIPTION OF THE DRAWINGS

FIG. 1 shows an isometric view of the valve block assembly.

FIGS. 2A, 2B and 2C are sectional views of the valve block assembly.

FIGS. 3A, 3B and 3C are series of plan views of the valve block.

FIG. 4 is an isometric view of the interior of the valve block assembly, illustrating the various channels.

DETAILED DESCRIPTION OF THE INVENTION

Figure 5B:
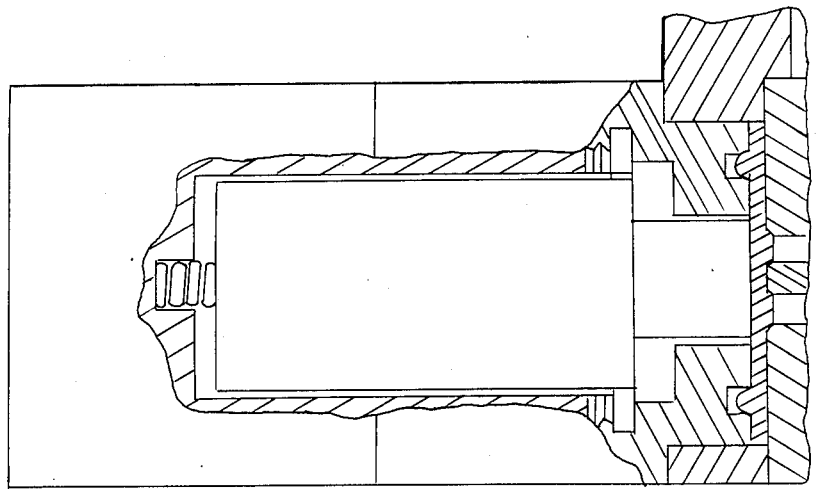
FIGS. 5A and 5B are a view of the valve means with the relief groove, as compared to a view of a conventional valve without such a groove.

In a preferred embodiment, the valve block has two delivery valve surfaces, best seen in FIG. 3. At least one valve site is provided on each surface. The valve block provides a plurality of inlets and a common outlet. At each valve site one finds an inlet channel 24, and an access to the common channel running to common outlet 18. The access is in the form of a groove 25 on the valve surface. The common channel connects each valve site to a valve site on the other valve surface. Linear channel sections 26 connect the groove 25 of one valve site to the groove of the next valve site on the other surface.

Since channel sections 26 are linear, and are open to both valve surfaces, they may be cleared of any obstruction by running a fine wire through the section. Moreover, these sections do not present the problem of a dead volume interior to the valve block.

As seen in FIG. 1, fluid reservoirs 10 may be connected to the valve block 16. These supply fluids (gases and liquids) by tubing 11 and 13, respectively to delivery channels 24, as shown in FIG. 2. Each delivery (feeder) channel communications with one valve site at output end 24a. This output end 24a is spaced apart from the open groove 25.

A diaphragm valve 19, 20, 21 is disposed at each valve site. When the valve is closed, diaphragm 5 is pressed against output end 24a and open groove 25, so fluid cannot pass out of the delivery channel and into the common channel. However, the diaphragm merely covers and does not plug the groove, so fluid already in the common channel but upstream of the valve may flow through the groove and on downstream. Opening delivery valve 19 allows pressurized fluid from channel 24 to leak into groove 25. Preferably, the groove has a "V-shaped" or "rounded V-shaped" cross-section, so that only a small movement of the diaphragm is needed to permit this flow.

The solenoid-holding block 4 is internally threaded to accept a standard solenoid 1. The unusual two-tiered design allows these blocks to be secured directly to the aluminum cradle 15 surface with screws through the upper tier. The lower cylindrical tier extends inside the aluminum cradle 15 to make the seal at the valve block 16 surface by pressing against the captive membrane 5. This design also ensures precise alignment of the solenoid plunger 3 over the channel entry/exit holes 25,24 in the valve block 16 because the cylindrical lower tier can be made perfectly concentric with the plunger guide hole 4b.

Another advantage of this two-tiered design is that the solenoid-holding block 4 never comes into direct contact with the valve block 16 material. This is very important because valve blocks are made from chemically resistant thermoplastics which all cold-flow when subjected to mechanical stress. A design which puts any part of a solenoid-holding block directly on the plastic can change the mechanical properties of the valve, especially if the plastic material is heated or exposed to chemicals which even mildly attack it.

In our design, the only thing under compression in this critical area is the membrane seal 5 so negligible mechanical stress is placed on the valve block material 16. A controlled amount of compressive force can be applied to this membrane 5 by machining the solenoid-holding block 4 lower tier to the appropriate length. For example, if the membrane 5 is 0.020" thick and the lower tier extends to within 0.015" of the valve block 16 surface, 0.005" compression is applied when the solenoid-holding block 4 is secured into position.

Figure 5A:
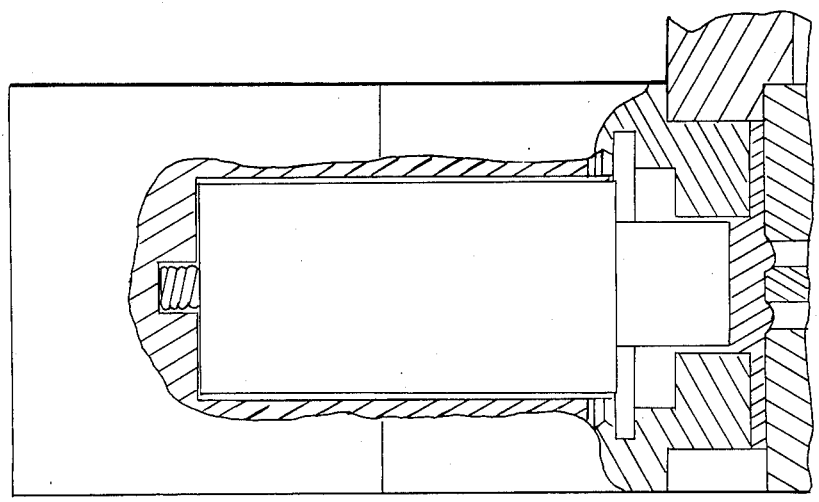
Figure 6C:
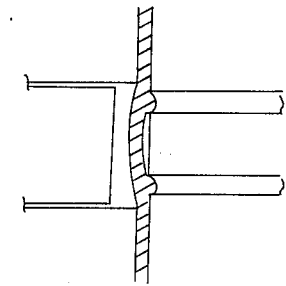
FIGS. 6A–6F are a series of side and end views of the present valve means and a conventional valve means, in open and closed positions.
Figure 6B:
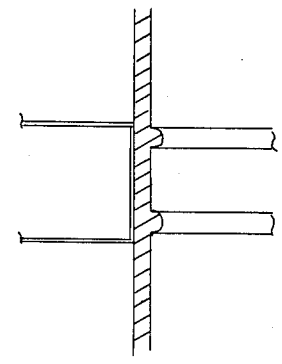
Figure 6A:
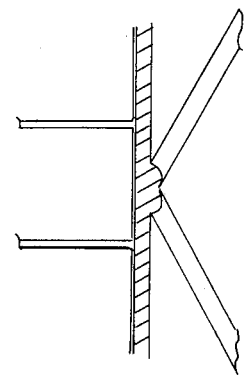
Figure 6F:
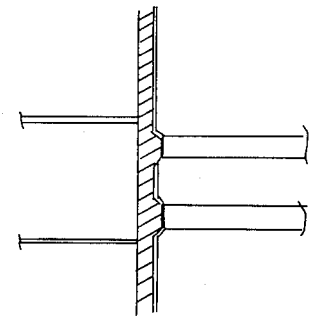
Figure 6E:
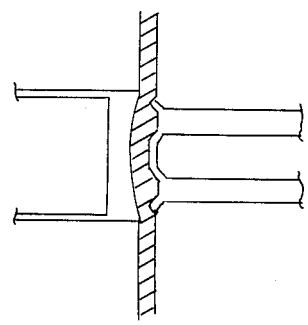
Figure 6D:
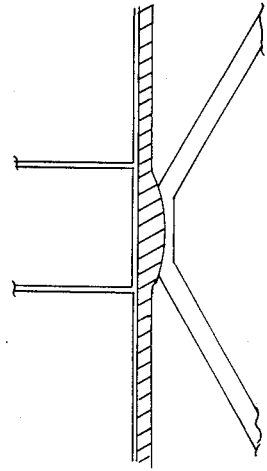

The relief groove 4a in the lower tier surface accommodates membrane material 5 which would otherwise cold-flow into the plunger guide hole 4b. If too much material flows into the plunger guide hole 4b, it will overcome the plunger spring 2 force and jam the plunger 3 upwards, preventing the valve from working (see FIG. 5).

While this recess is preferably in the form of a groove, it may take other forms which provide a relief volume into which the stressed diaphragm may flow.

A controlled amount of deformation is desirable since excess material within the plunger guide hole 4b acts as a spring and helps the membrane 5 lift. The relief groove 4a, while not essential, is preferred because it prevents overcompression of this material. The ideal balance is calculated by adjusting the parameters of membrane compression and relief groove 4a internal volume for a given guide hole 4b diameter.

The self-assisting action of the membrane is one key element in reliable valve operation. The entire solenoid-holding block 4 is designed to take advantage of this self-assisting action. Previous zero-dead-volume designs have required either a vacuum/pressure or vacuum/spring membrane actuation for reliable operation. Our design takes advantage of the energy stored in the compressed membrane to help lift it from the sealing surface. This is extremely important since it allows us to do away with awkward and expensive vacuum systems to "assist" the valves. In addition, it makes for a much less complicated solenoid/plunger arrangement since it does not have to be vacuum-tight.

Also, all channels at or terminating at the valve block 16 sealing surfaces are countersunk 27 so that a conical or V-shaped depression is formed at the surface. This allows a good seal and ensures that cold flow of the membrane 5 into the valve channel openings will form complementary conical or V-shaped protrusions which will move out of the channel easily when the valve is actuated. Without the conical or V-shaped countersink, the membrane 5 will cold-flow in a cylindrical shape and effectively plug the channel. This cylindrical plug must lift entirely out of the channel before fluid can flow because the internal surfaces of the valve channel and the membrane plug cannot separate. The conical or V-shape formed by our design will allow fluid to flow as soon as the membrane 5 moves because the two surfaces will instantly separate (see FIG. 6).

The tubing 11 and 13 in the reservoirs 10 are exposed only to a controlled atmosphere. When pressure valves are opened, inert gas enters the valve block at inlets 9 and directed through channels 22 into the tubing 12 of reservoirs 10. Excess gases are vented through channels 23 in vent manifold 6 when vent valves 20 are opened. The gases vented, which may be noxious, are routed to one or more vents and removed from the apparatus. Inert O-rings 28 on the bottom of valve block 16 provide a gas-tight-seal where the reservoirs 10 are screwed into inert bottle caps 29 of lower aluminum cradle 15 of the block 16.

While, preferably, a single inert atmosphere is supplied to all reservoirs, it is possible to provide different reservoirs with different gases. Also, it is possible to eliminate tubing 12 and permit the channels 22 to communicate directly with reservoirs 10.

Numerous modifications will be apparent to those of ordinary skill in the art. The tube leading from the gas regulators may be made of nonporous metal. The tubing running from the valve block assembly to the reaction chamber may be eliminated by mounting the reaction chamber on the valve block assembly. (A detached reaction chamber is, however, easier to heat.)

Figure 7B:
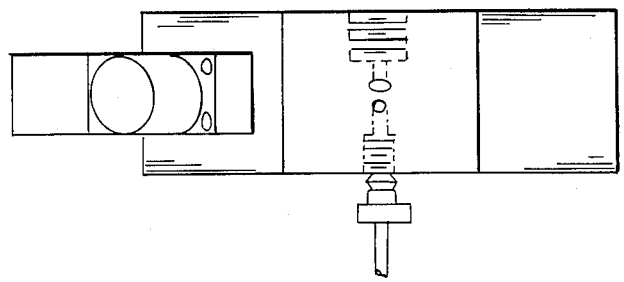
FIGS. 7A and 7B are plan and side views of a second embodiment of the valve block assembly.
Figure 7A:
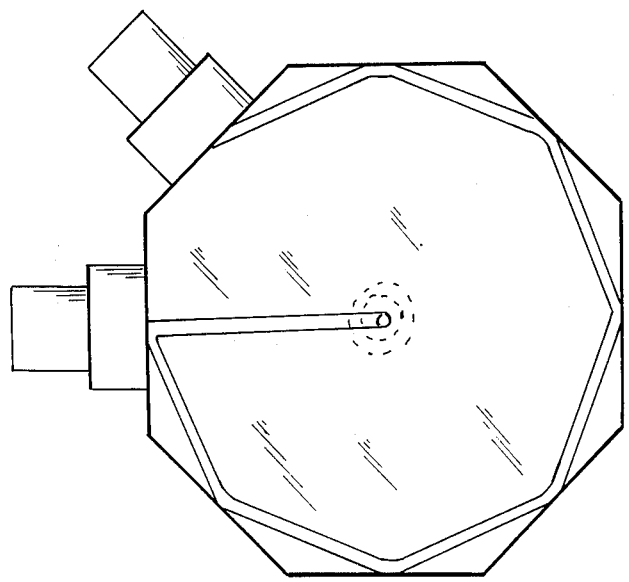

In another embodiment (FIG. 7), the valve block provides more than two valve surfaces. As diagrammed, the valve body is octagonal, with each of the eight sides providing a valve site. The common channel comprises a series of linear intervalve sections, each section running from one side to an adjacent side. It terminates in a section running from the final valve site to the center, where an axial outlet channel is located. At each valve site, one may provide connecting grooves as taught above, or provide intervalve sections which intersect at the valve surface as taught by Hunkapiller.

In another modification, the common channel of the valve block is provided with a common inlet "upstream" of the feeder channels. This inlet may be helpful in a number of respects. First, it can be used to introduce a fluid which will clean or dry the common channel. Second, the common outlet 8 of one valve block could be connected to the common inlet of another. If desired, this inlet may be valved.

We claim:

1. A valve block assembly comprising a valve block having at least two delivery valve surfaces disposed in different planes, at least two delivery channels connectable to external reservoirs, and a common outlet channel connectable to a reservoir; each of said valve surfaces having at least one valve site adapted to receive a diaphragm valve, said common channel comprising at least two linear sections, each linear section having an inlet end at a valve site on one valve surface and an outlet end at a valve site on another valve surface, each valve site including a connecting groove in said common channel connecting the outlet end of one section to the inlet end of an adjacent section, each delivery channel having an outlet at a valve site but spaced from said groove, said diaphragm valve being adapted to control fluid communication between said groove and said delivery channel outlet without affecting fluid communication along said common channel.

2. The valve block assembly of claim 1, the groove having side walls, said side walls diverging as they approach the valve surface.

3. The valve block assembly of claim 1, further comprising a diaphragm valve means disposed at each valve site.

4. The valve block assembly of claim 3, wherein the valve means comprises a diaphragm capable of sealing said connecting groove from said delivery end, means for urging said diaphragm into a sealing position, means having a recess into which said diaphragm may flow if the diaphragm deforms in the sealed position, and means for urging said diaphragm out of a sealing position.

5. The valve block assembly of claim 4 in which the diaphragm is biased to a sealing position.

6. The valve block assembly of claim 4 in which the connecting groove has side walls which diverge as they approach the surface, whereby the opening of the valve is facilitated.

7. The valve block assembly of claim 2 in which the outlet of the delivery channel is conical or frusto-conical in shape.

8. The valve block assembly of claim 1 wherein the delivery valve surfaces are in parallel planes.

9. A valve block assembly comprising a valve block having a polygonal cross-section defined by at least three delivery valve surfaces in different planes, wherein a first and a second surface are adjacent to each other along a common edge, and wherein a second and third surface are adjacent to each other along a common edge, at least one fluid delivery valve means disposed at each surface, and a common channel formed in said valve block, said channel comprising a first linear section connecting a delivery valve means on the first surface with a delivery valve means on the second surface, and a second linear section connecting a delivery valve means on the second surface with a delivery valve means on the third surface and the outlet of one such section is proximate to and in fluid communication with the inlet of another such section at a valve site, and wherein the delivery valve means comprises a delivery conduit and means for controlling the passage of fluid from said conduit into the common channel.

* * * * *